Patented May 12, 1942

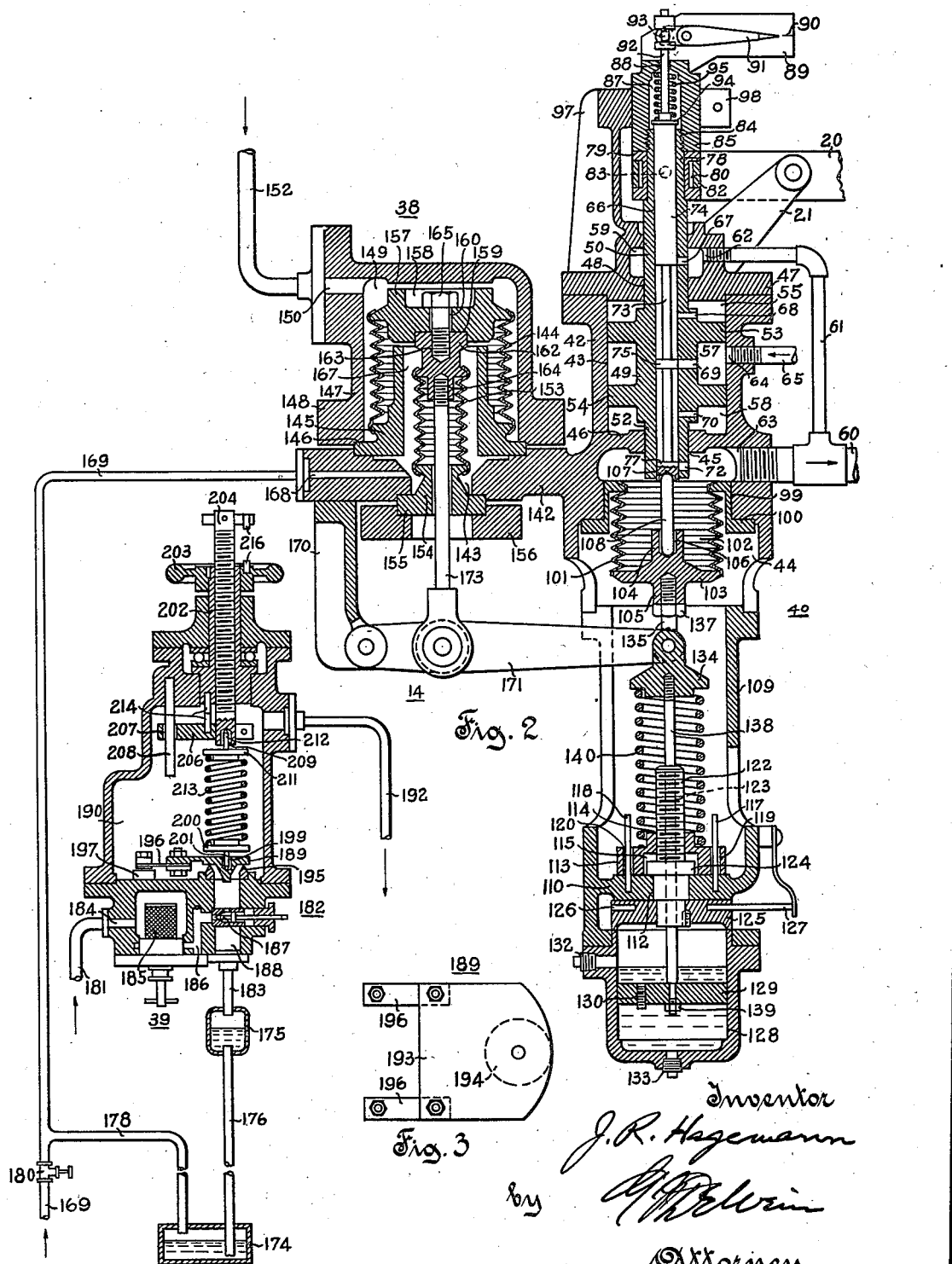

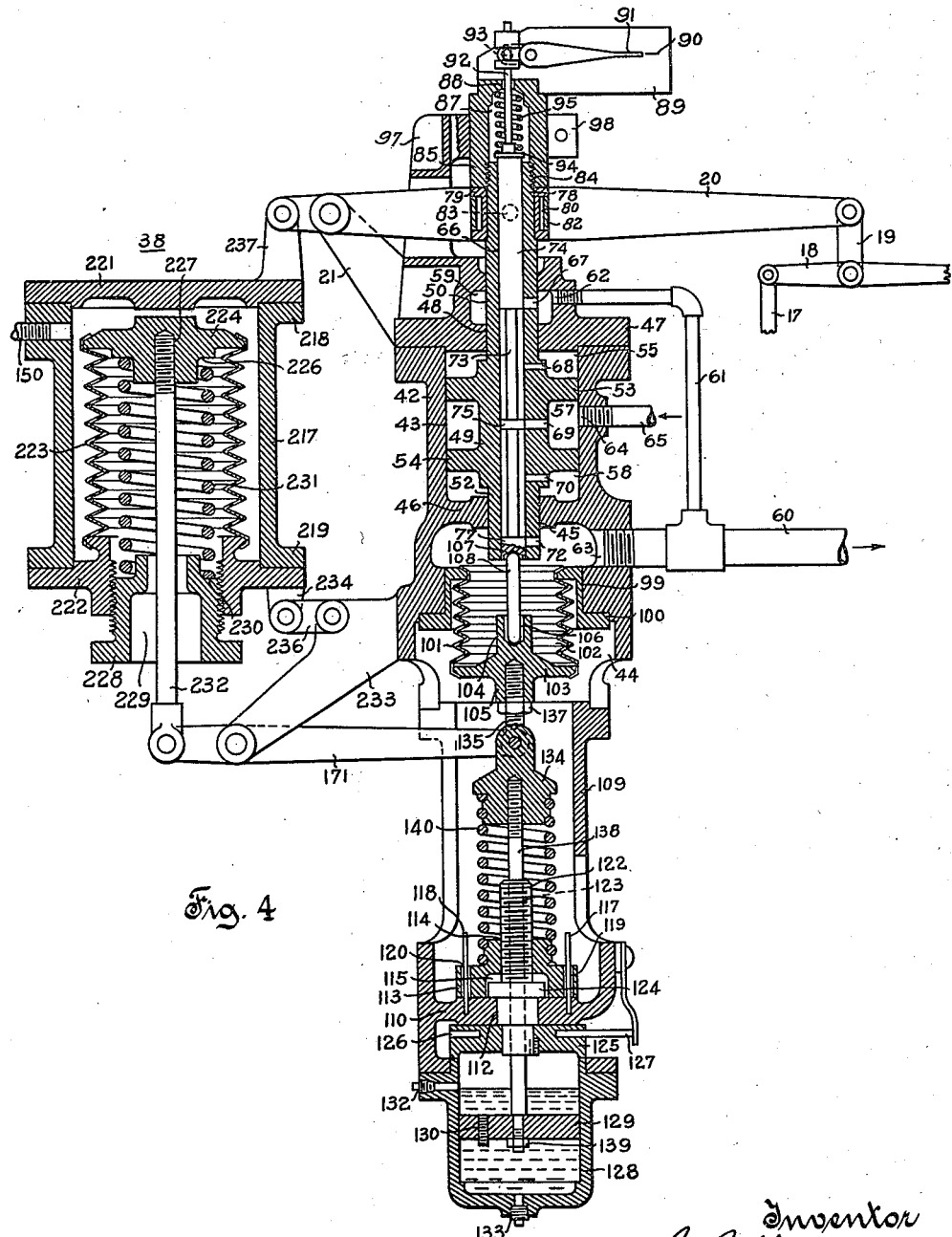

2,283,138

UNITED STATES PATENT OFFICE 2,283,138

TURBINE REGULATION AND REGULATING APPARATUS

John R. Hagemann, Milwaukee, Wis., assignor to Allis-Chalmers Manufacturing Company, Milwaukee, Wis., a corporation of Delaware Application September 19, 1938, Serial No. 230,577

15 Claims. (Cl. 137—158)

This invention relates to turbine governing systems and parts thereof and more particularly to such systems and parts especially adapted for regulating a relatively high pressure elastic fluid turbine arranged for operation in connection with an existing low pressure turbine system. The pressure responsive device and the hydraulic biasing means therefor herein shown and described have been made the basis of a divisional application, Serial No. 427,699, filed January 22, 1942.

The addition of a high pressure turbine unit, boiler and turbine, to an existing steam plant represents a recent development in turbine systems which makes possible the transformation of an antiquated power plant into a modern one with the least possible expense. However, in a system of this type the high pressure turbine, which is known as a superposed or top turbine, may operate under widely varying conditions which are primarily determined by the relative capacities of the superposed turbine and the existing system or that part of the existing system which is in actual operation at any particular time. This necessitates employing a governing system for the superposed turbine which is capable of regulating the turbine in response either to (1) changes in load as determined by changes in speed or (2) variations in back pressure; i. e. changes in the pressure of the exhaust steam which is delivered to the header supplying steam to low pressure turbines and which varies in response to pressure variations in the low pressure header.

A governing system capable of regulating a superposed turbine in the manner aforesaid necessarily comprises a speed responsive device and a pressure regulator cooperating to control the inlet valve or valves of the turbine and, in order to effect satisfactory regulation, it is essential that the pressure regulator be extremely sensitive and capable of maintaining the pressure to be regulated, which may be 200 pounds per square inch and higher, within narrow limits. In addition, in order to place the turbine under the control of either the speed responsive device or the pressure regulator, the pressure regulator must be so constructed and the means interconnecting the pressure regulator and the speed responsive device so correlated that such a change-over can be readily accomplished without effecting a sudden change in turbine load.

Pressure regulators have been developed which operated in a satisfactory manner for pressures in the vicinity of 100 pounds per square inch, but with the introduction of the superposed turbine, the pressure to be regulated i. e. the exhaust or back pressure, have been materially increased and are now 200 pounds per square inch and higher and, as a result, known types of regulators are incapable of maintaining the pressure within the extremely narrow limits (permissible pressure variation) necessary for satisfactory regulation. The permissible pressure variation decreases as the pressure to be regulated increases and it is therefore essential that the regulator be extremely sensitive; i. e. a relatively small variation in the pressure to be regulated should produce a full stroke of the pressure responsive element which should also respond to incremental changes in pressure in order to be sensitive. The sensitiveness of a pressure regulator can be materially increased by enlarging the effective area of the bellows or other surface exposed to the pressure to be regulated which necessitates increasing the counteracting or balancing force by reducing the scale of the spring producing the counteracting or balancing force which in turn necessitates increasing the size of the spring (more coils or larger diameter). However, these arrangements are impractical as they result in a device of such large physical dimensions as to be prohibitive.

The use of a weight to produce the necessary balancing force appears ideal since it does not introduce a scale. However, the most practical device for operation at pressures exceeding 200 pounds per square inch involves the use of a bellows and bellows satisfactory for operation at such pressures i. e. bellows with a relatively small scale effect, generally have an effective area of approximately 11 square inches which is subjected to the pressure to be regulated. Therefore, if the normal value of the pressure to be regulated is 220 pounds per square inch, the force to be counteracted would be 2420 pounds (220×11). Such an arrangement necessitates the use of a weight which is entirely too cumbersome for practical purposes or if a lever arrangement is used in order to reduce the weight, it involves the use of a heavily loaded knife edge which is also undesirable. Moreover, the mass effect of the weight necessitates the application of a relatively large force in order to obtain a sufficient degree of acceleration to avoid sluggishness and when set in motion its momentum tends to produce overregulation and chattering. This requires the application of a suitable damping means such as a dashpot mechanism actuated by movement of the weight and the use of a spring in the connection between the weight and the pressure responsive element and although these additions have improved the operation of such regulators, it is a known fact that the regulators vibrate and chatter excessively which is highly undesirable both from a maintenance and operating standpoint. Therefore, while a weight is perfect under static conditions, it should be obvious that under transient conditions a weight has certain material disadvantages because of its mass which renders its use undesirable, if not impractical.

Another feature requiring particular consideration is that the ready adjustment of the counteracting force is essential in order to render the turbine responsive to changes in speed and/or pressure without effecting a sudden change in load.

One of the objects of this invention is to provide an improved governing system for turbines.

Another object is to provide an improved governing system employing a pressure regulator and a speed responsive device in which the pressure regulator is so constructed and the pressure regulator and the speed responsive device so correlated that a turbine can be readily rendered responsive to changes in pressure and/or speed without effecting a sudden change in load.

Another object is to provide an improved pressure regulator which is extremely sensitive and capable of maintaining the pressure to be regulated within the limits necessary for satisfactory regulation.

The invention accordingly consists of the various features of construction, combinations of elements, and arrangement of parts as more particularly pointed out in the appended claims and in the detailed description, reference being had to the accompanying drawings, in which:

Fig. 2 is a detailed sectional view of the pressure regulator and the means producing the counteracting force illustrated generally in Fig. 1.

Fig. 3 is a plan view of the pressure regulating valve element;

Fig. 4 is a detailed sectional view of a modified form of pressure regulator adapted for use in a system of the type illustrated in Fig. 1.

Figure 1:
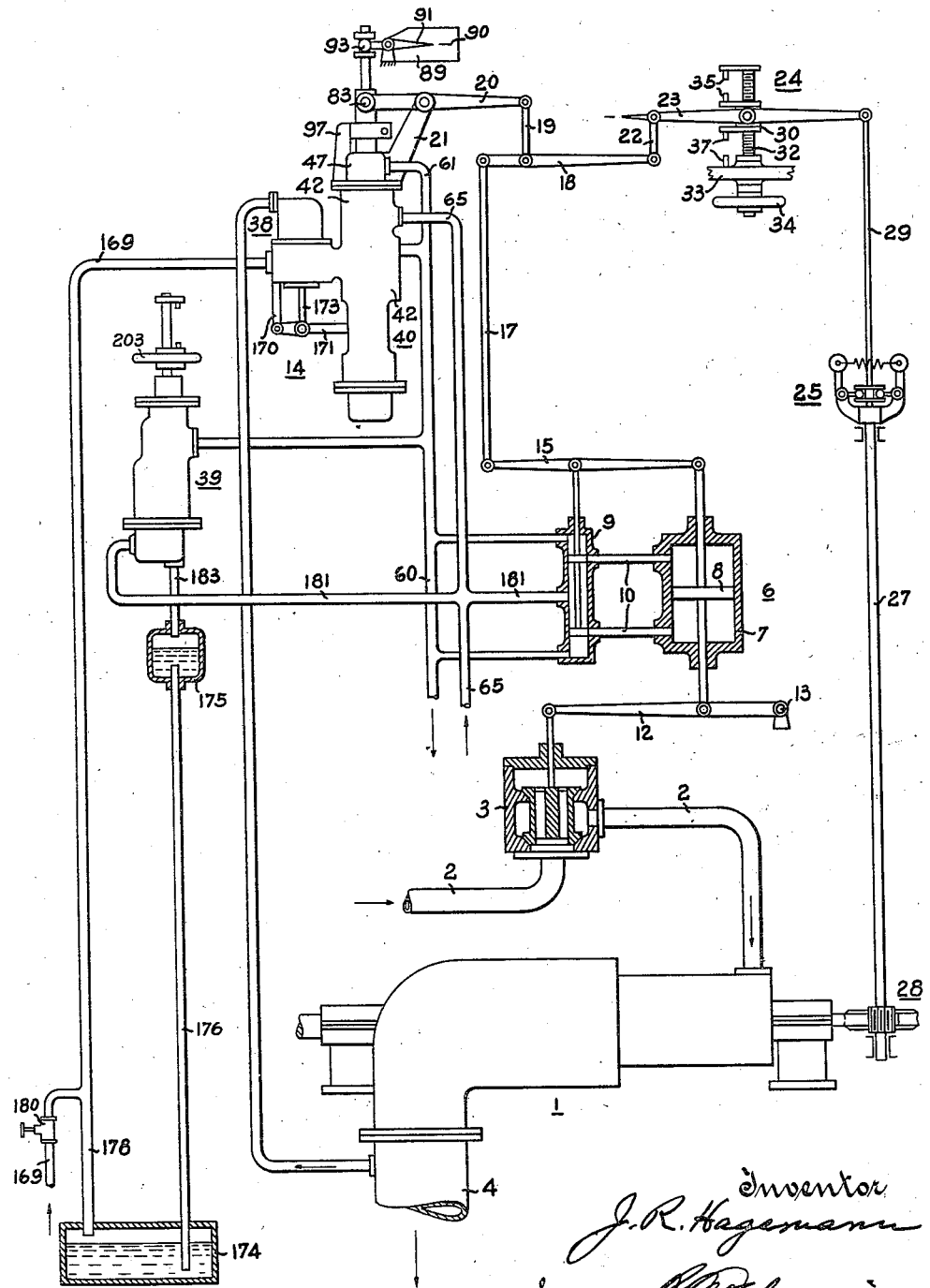
Fig. 1 is a schematic illustration of a governing system embodying the invention.

Referring to Fig. 1, 1 represents a high pressure, superposed or top turbine having a steam admission conduit 2 in which is located a steam admission valve 3. An exhaust conduit 4 discharges the exhaust steam into a low pressure steam header which may be considered as including the exhaust conduit 4 as a part thereof which header is connected with one or more low pressure steam turbines in the usual manner. The header and low pressure turbines are omitted for the purpose of simplifying the disclosure. The steam admission valve 3 is controlled by means of a servomotor 6 comprising a cylinder 7, a double acting power piston 8 therein and a valve 9 controlling the flow of the actuating fluid through pipes 10 to the cylinder 7. The power piston 8 is operatively connected with the valve 3 by means of a lever 12 having one end pivotally connected with the valve 3, its other end pivotally mounted on a fixed pivot 13 and a pivotal connection intermediate its ends with the power piston 8.

A pressure regulator designated generally by the numeral 14 is operatively associated with the valve 9 by mechanism comprising a floating lever 15 connected intermediate its ends with the valve 9 and which has one end pivotally connected with the power piston 8 and its other end pivotally connected with one end of a link 17, the other end of which is pivotally connected with one end of a floating lever 18. A link 19 has one end pivotally connected with the floating lever 18 intermediate its ends and its other end pivotally connected with one end of a lever 20 which is pivotally supported intermediate its ends on a bracket 21 and has its other end pivotally connected with the operator 40 of the pressure regulator 14. A link 22 has one end connected to a lever 23 which is pivotally mounted intermediate its ends on an adjustable fulcrum 24 and which has its other end pivotally connected with one end of a rod 29 which has its other end operatively associated with a speed responsive device 25. The speed responsive device is operatively connected with the turbine spindle by means of a shaft 27 and gearing 28. The adjustable fulcrum 24 comprises an internally threaded block 30 which is mounted on an externally threaded rod or shaft 32 mounted for rotation in a bearing structure 33 and which has attached thereto a hand wheel 34 for rotating the rod 32. The hand wheel 34 cooperates with the bearing structure 33 to prevent longitudinal movement of the rod 32. Stops 35 and 37 limit the upward and downward movement respectively of the block 30 in response to the rotation of the shaft 32.

The pressure regulator 14 comprises a pressure responsive device 38, a balancing force creating means 39 and a power operator 40. Referring to Fig. 2, it is seen that the power operator 40 comprises a casing 42 defining a cylinder 43 and a chamber 44 which is in communication with one end of cylinder 43 by means of an axially disposed passage 45 in the end wall 46 of cylinder 43. A cylinder head or cap 47 closes the other end of cylinder 43 and has a centrally disposed passage 48 therein in axial alinement with the passage 45 in the end wall 46. A double acting, floating piston 49 is disposed within the cylinder 43 and has oppositely extending axially disposed portions 50 and 52 extending through the alined openings 48 and 45, respectively. The piston 49 has longitudinally spaced laterally extending annular portions 53 and 54 which contact the inner wall surface of the casing 42 and forms annular fluid chambers 55, 57 and 58. The centrally disposed passage 48 in the cylinder head or cap 47 is enlarged intermediate its ends to form an annular fluid chamber 59 surrounding the extending portion 50 of the piston 49. Chamber 59 communicates with a main oil drain pipe 60 by means of a pipe 61 and the drain passage 62. The casing 42 immediately beneath the wall 46 is provided with a drain passage 63 which is connected with the main drain pipe 60 and is in communication with the chamber 44. The casing 42 is also provided with a fluid inlet passage 64 which communicates with the annular chamber 57 formed between the annular portions 53 and 54 of the piston 49 and with a supply pipe 65 which in turn is in communication with a suitable source of fluid under pressure. The piston 49 has an axial bore 66 extending throughout the length of the piston and ports or passages 67, 68, 69, 70 and 72 connecting the axial bore 66 with the fluid chambers 59, 55, 57, 58 and the upper portion of chamber 44, respectively.

A reciprocable valve member 73 is disposed within the axial bore 66 of the piston 49 and has enlarged portions 74, 75 and 77 operatively associated with ports 67, 69 and 72, respectively to control the flow of fluid therethrough. The axially extending portion 50 of piston 49 has a reduced portion 78 at its upper end on which is positioned an annular collar 79 provided with an annular external groove 80. A sleeve 82 is slidably positioned in said groove for movement laterally of the piston portion 50 and has oppositely disposed laterally projecting pins 83 (only one of which is shown) which are pivotally connected to the adjacent, bifurcated end of the lever 20. The reduced portion 50 of the piston 49 extending above the collar 79 is externally threaded at 84 and an elongated hollow, nutlike member 85 has its lower portion in threaded engagement with the externally threaded portion 84 of the piston 49 to securely clamp the collar 79 thereon. The member 85 provides an elongated chamber 87 overlying the upper end of the piston 49 and has a restricted opening 88 in axial alinement with the bore 66. The member 85 also carries an indicator plate 89 having a zero position mark 90 thereon and a pointer 91 which is pivotally mounted on the plate in any suitable manner. The enlarged portion 74 of the valve member 73 extends above the upper end of the piston 49 and is provided with an axially extending reduced portion 92 which passes through the opening 88 in member 85 and is pivotally connected by any suitable means 93 with the pointer 91 whereby movement of the valve member 73 produces a proportional movement of the pointer 91.

It should be particularly noted that the plate 89 moves with the piston 49 and that the pointer 91 is moved about its point of pivotal connection with the plate 89 by means of the valve member 73. Consequently, it should be obvious that whenever the pointer 91 is in line with the zero mark 90 on the plate 89, as shown in Figs. 1, 2 and 4, the valve member 73 and the piston 49 are in a neutral position; i. e. the ports 67, 69 and 72 in the piston 49 are closed by the enlarged portions 74, 75 and 77, respectively, of the valve member 73.

The junction between the portions 74 and 92 of the valve member 73 is stepped to provide a spring seat 94 and a relatively light follower spring 95 has one end engaging the spring seat 94 and its opposite end abutting the upper wall of chamber 87. A bracket 97 made integral with or secured to the cap member 47 in any desired manner supports or carries a split clamp ring 98 which surrounds the member 85 and by means of which the piston 49 and lever 20 may be locked against movement.

The interior of casing 42 at a point immediately beneath the drain passage 63 has an annular portion 99 of reduced diameter. An annular bellows carrier 100, which is removably secured in the casing 42 in any desired manner, extends within the reduced portion 99 of the casing 42 and supports a flexible sealing means, such as the bellows 101, to form a sealed fluid chamber 102 into which the lower end portion 52 of the piston 49 extends. The bellows 101 includes a cap 103 having oppositely disposed axially extending portions 104 and 105. The upper surface of the axially extending portion 104 has a centrally disposed recess 106 therein which has its bottom wall formed in the shape of an inverted cone. The enlarged portion 77 of valve member 73 has a similarly shaped recess 107 formed in its lower surface in opposed relation to the recess 106. A rod 108 of less diameter than the diameter of recesses 106 and 107 has its ends, which are shaped to conform with the bottom surface of the recesses 106 and 107, disposed therein to provide an operative connection between the flexible sealing means 101 and the valve member 73, which connection is maintained by the follower spring 95.

The casing 42 has a depending portion 109 forming a continuation of chamber 44 which portion includes a bottom or end wall 110 having an axially disposed opening 112 therein. An annular stepped spring retainer 113 has a centrally disposed internally threaded opening 114 which terminates in an enlarged recess 115 in the bottom surface of the spring retainer 113. The opening 114 and the recess 115 are disposed in coaxial relation with respect to the opening 112 in the wall 110 and the spring retainer 113 is prevented from rotating by means of upwardly extending pins 117 and 118 which are secured in wall 110 and which project through diametrically disposed openings 119 and 120, respectively, in the spring retainer 113. An elongated adjusting member 122 having a coextensive axial bore 123 extends from a point beneath the end wall 110 upwardly through the opening 112 therein and through the opening 114 in the spring retainer 113 to a point a considerable distance thereabove. The elongated member 122 has an annular collar or flange 124 disposed within the recess 115 of the spring retainer 113 and cooperates with the upper surface of wall 110 to retain the member 122 in the position shown. The portion of the member 122 extending above the collar 124 is externally threaded and is in threaded engagement with the internally threaded portion of the spring retainer 113. An annular collar 125 is secured on that portion of the member 122 which extends beneath the wall 110 to prevent axial movement of the member 122 and, since the spring retainer 113 is prevented from rotating by means of pins 117 and 118, rotation of the member 122 will produce axial movement of the spring retainer 113. The peripheral portion of collar 125 is provided with an annular series of shallow bores or recesses 126 which are adapted to receive a spring latch 127 to hold the spring retainer 113 in its adjusted position.

Depending beneath the end wall 110 is a dashpot mechanism comprising a cylinder 128 having therein a piston 129 which includes the usual form of adjustable breather valve 130. The cylinder 128 is provided with the usual filling and drain plugs 132 and 133, respectively. A stepped spring retainer 134 is detachably secured to the axially extending portion 105 of the bellows cap 103 by means of a threaded stem 135 and a lock nut 137. A piston rod 138 of considerably less diameter than the bore 123 has one end detachably secured to the dashpot piston 129 by means of a nut 139 and extends upwardly through the bore 123 in the member 122 and has its upper end threadably engaged with the spring retainer 134. A compression spring 140 has one end abutting the spring retainer 134 and its other end abutting the spring retainer 113. Therefore it should be obvious that the valve member 73, the flexible sealing means 101 and the dashpot piston 129 are operatively connected for simultaneous and equal movement in either direction and that the initial compression of the spring 140 can be readily varied by rotating the adjusting member 122.

The casing 42 has a laterally extending bracket 142 constituting a base or a supporting surface for the pressure responsive device 38; the base having therein a centrally disposed opening 143. A large bellows 144 including an annular carrier 145 having an outward and laterally extending flange 146 thereon is mounted on the base 142 in concentric relation with the opening 143 therein. A casing 147, which is adapted to enclose the bellows 144, is provided at its bottom edge with an outwardly and laterally extending flange 148 which cooperates with the flange 146 on the annular bellows carrier 145 and securely clamps the bellows 144 to the base 142. The space between the inner wall of the casing 147 and the bellows 144 defines a pressure chamber 149 having a fluid inlet passage 150 which communicates by means of a pipe 152 with the fluid under pressure which is to be regulated. Disposed within the large bellows 144 is a relatively small bellows 153 which is mounted in coaxial alinement with the opening 143 in the base 142 and has an elongated annular carrier 154 extending through the opening 143 in the base 142 which carrier has an outward and laterally extending flange 155 abutting the undersurface of the base 142. An annular clamping ring 156, which is secured to the base in any desired manner, cooperates with the flange 155 on the carrier 154 to securely clamp the carrier 154 to the base 142. The large bellows 144 has a bellows cap 157 which has in its upper and lower surfaces centrally disposed recesses 158 and 159, respectively, which are in communication by means of an axially extending bore 160. The small bellows 153 has a bellows cap 162, the upper portion of which has an external diameter slightly less than the internal diameter of the recess 159 in the large bellows cap 157. The upper and lower surfaces of the bellows cap 162 have centrally disposed internally threaded recesses 163 and 164, respectively. The recess 163 is in axial alinement with the bore 160 in the large bellows cap 157 and the large and small bellows caps are secured together by means of a cap screw 165 which passes through the bore 160 in the large bellows cap and threadedly engages the small bellows cap by means of the internally threaded recess 163.

The annular space existing between the large and small bellows constitutes a balancing pressure chamber 167 into which a fluid under pressure is admitted by means of passage 168 to which is connected a fluid supply pipe 169. Depending from the base 142 is a bracket 170 to which is pivotally connected one end of a lever 171 which has its opposite end pivotally connected with the spring retainer 134. A rod 173 extends upwardly through the annular carrier 154 and has its upper, threaded end threadably engaged with the small bellows cap by means of the internally threaded recess 164 and its lower end pivotally connected to the lever 171 intermediate the ends thereof.

The balancing force creating means designated generally by numeral 39 comprises means for establishing a hydraulic column consisting of a lower closed vessel 174, an upper closed vessel 175 and a pipe 176 connecting the upper and lower vessels and extending a material distance within and towards the bottom of the latter. A pipe 178 communicates with the top portion of the lower vessel 174 and with the pipe 169 which includes a valve 180 for controlling the supply of a fluid such as water having a density materially less than that of the mercury or other fluid used to establish the hydraulic column. The valve 180 is normally closed during operation and is used for the purpose of adding additional fluid to replace that lost by leakage and for initially filling the system when it is placed in operation. The counteracting force produced by the hydraulic column is varied by subjecting the top of the column, which is maintained in the vessel 175, to a variable fluid pressure. A suitable viscous fluid such as oil is supplied to the vessel 175 by means of a pipe 181 communicating with a source of fluid under pressure, a pressure regulator 182 and a pipe 183 connecting the regulator 182 with the top of vessel 175.

The pressure regulator 182 comprises a housing having a fluid inlet passage 184, a filter chamber 185, a passage 186, a needle valve 187, a chamber 188, a pressure regulating valve 189 and an accumulating chamber 190. The flow of fluid to the chamber 188 is controlled by means of the needle valve 187 and the pressure within the chamber 188 is maintained at the desired value by means of the valve 189. The fluid entering the accumulating chamber 190 flows therefrom through the pipe 192 which pipe communicates with the chamber 190 a material distance above the valve 189 and with a reservoir (not shown).

The valve 189, reference also being had to Fig. 3, comprises a generally rectangular valve plate or disk 193 having on its under surface a depending thickened circular portion 194 cooperating with an annular knifelike edge 195 constituting a valve seat. The end of the valve disk remote from the end having the depending seating surface thereon has rigidly secured thereto in spaced parallel relation a pair of rearwardly extending spring bars 196 which are in turn secured to a pair of bosses 197, constituting the fulcrum for the disk 193. The upper surface of the valve disk 193 is provided with a recess 199 disposed in coaxial relation with the valve seat 195 which recess has its bottom surface shaped in the form of an inverted cone. A spring retainer 200 has a depending centrally disposed stem 201 of less diameter than the internal diameter of the recess 199 in the valve plate 193 which extends into the recess 199 and has its lower end shaped to conform with the bottom surface thereof.

The housing of the pressure regulator 182 includes a rotatable internally threaded sleeve 202 disposed above the oil chamber 190 and in coaxial relation with the recess 199 in the valve plate 193; said sleeve being provided with a hand wheel 203 for rotating the same. An externally threaded rod 204 extends through the sleeve 202 and has its ends extending beyond the end portions of the said sleeve. The lower end portion of the rod 204 has secured thereto a plate 206 having an opening 207 therethrough which extends in parallel relation to the rod 204. A fixed pin 208 extends downward through the opening 207 in the plate 206 whereby the rod 204 is prevented from rotating when the sleeve 202 is rotated. The lower end of the rod 204 is provided with a recess 209, which is similar to the recess 199 in the valve plate 193, and a spring retainer 211, which is provided with a centrally disposed stem 212 of less diameter than the recess 209, is mounted with the stem 212 extending within the recess 209. A compression spring 213 is mounted with its lower end supported on the spring retainer 200 and its upper end engaging the spring retainer 211 whereby rotation of the hand wheel 203 produces an axial movement of the rod 204 to vary the compression of the spring 213 which constitutes the primary biasing means for the valve 189. Stops 214 and 216 are provided for limiting the upward and downward movement, respectively, of the rod 204.

The valve disk 193 cooperates with the viscous fluid maintained in the accumulating chamber 190 to eliminate chattering or vibration of the valve, an inherent defect in regulating valve arrangements, which quickly destroys the valve seat and renders the valve inoperative to maintain the pressure within the narrow limits necessary for satisfactory operation. In the usual arrangement, a sudden increase in pressure produces an extremely rapid opening of the valve thereby accelerating the valve mechanism and, due to the momentum or kinetic energy effect, the valve is opened much wider than if the pressure were increased gradually. The energy which is stored in the biasing spring then acts to move the valve toward its closed position and as a result the system chatters or oscillates and tends to produce pulsations in the pressure of the fluid in addition to the destructive effects previously stated. In order to eliminate this common defect, it is essential to produce a damping effect sufficient to prevent the valve from opening wider upon a sudden increase in pressure than it would open if the pressure were increased gradually. This result is accomplished by rendering the valve, disk 193, inherently self damping by positioning the disk 193 in the accumulating chamber 190 whereby its movement is always resisted by the viscous fluid contained therein and, while the responsiveness of the valve will vary with changes in viscosity, it has been determined empirically that, in order to obtain satisfactory results, the area of the surface acted upon by the viscous fluid to retard the valve movement must be at least five times greater than the area of the surface acted upon by the fluid under pressure to produce an opening movement of the valve.

The operation of the pressure regulator illustrated by Fig. 2, assuming that the pressure to be regulated increases slightly, is as follows: The large bellows 144 is slightly compressed and, since the large bellows 144 and the small bellows 153 are secured together as a unit, the rod 173 moves downward and moves the lever 171 in a clockwise direction about its fixed pivot point on the bracket 170 and, due to the ratio of the distances between the fixed pivot of the lever 171 and its points of pivotal connection with the rod 173 and the spring retainer 134, which ratio in the present arrangement is approximately 4:1, a slight movement of the bellows 144 in response to a slight increase in the pressure to be regulated produces a relatively large, equal and simultaneous downward movement of the valve member 73, the flexible sealing means 101, compression spring 140 and the dashpot piston 129. Movement of the valve member 73 in the direction specified moves the indicating end of pointer 91 upward with respect to the mark 90 on the plate 89 and uncovers ports 69 and 72 in the piston 49 whereby fluid under pressure from chamber 57 flows upward about the valve member 73 and through port 68 into the chamber 55. At the same time, the fluid retained in chamber 58 passes out through port 70, downward about the valve member 73 and through port 72 into the chamber 102 from which it is returned to the source of supply by means of passage 63 and drain pipe 60. As a result, piston 49 immediately moves downward until the ports 69 and 72 are closed by the enlarged portions 75 and 77 on the valve member 73. The piston 49 and the valve member 73 are then in neutral position and no further movement of either the valve member 73 or the piston 49 will occur until the pressure to be regulated again changes or the means producing the counteracting force is varied by turning the hand wheel 203. Since the indicating plate 89, on which the pointer 91 is pivotally mounted, is carried by the piston 49, movement of the piston 49 to a neutral position brings the pointer 91 into alinement with the zero mark 90 on the plate 89 as shown in Fig. 2. Upon a decrease in pressure, the operation is similar to that just described, the only difference being that the valve member 73 and the interconnected parts move upward instead of downward and fluid under pressure is supplied to chamber 58 while chamber 55 is in communication with the drain pipe 60 by means of pipe 61, passage 62, chamber 59 and ports 67 and 68. Movement of the piston 49 is transmitted through a system of levers such as shown in Fig. 1 to the turbine admission valve or valves.

The use of an inner bellows 153 cooperating with a larger bellows 144 to form therebetween a counteracting pressure chamber eliminates the use of a seal or gland about the rod 173 which materially increases the sensitiveness of the regulator by eliminating the friction inherently produced when a gland or other stationary means contacts a moving part to provide an effective fluid seal. Additional friction is also eliminated by providing a similar means for operatively connecting the valve member 73 with the spring retainer 134. The use of a simple lever arrangement by which a relatively small movement of the pressure responsive device produces a relatively large resultant movement of the parts actuated thereby, the ratio of movement being approximately 4:1, permits the use of an extremely sensitive biasing means, the light spring 140, for counteracting the residual force of the pressure responsive device as the necessary balancing force is decreased in the same ratio. Moreover, the relatively large movement of the valve member 73 assures positive operation of the piston 49 in response to a small change in pressure without the tendency to cause the regulator to hunt which inherently results when the control of the power piston is attempted by a relatively slight movement of such a valve. Furthermore, in order to prevent surging, some form of damping or retarding means is necessary and, in order to be effective, the damping means should have a relatively large stroke and should be rendered operative at the earliest possible moment. This result is accomplished by connecting the dashpot piston with the spring retainer 134 whereby the dashpot piston and the valve member 73 are immediately and simultaneously moved an equal distance which distance is materially greater than the actuating movement of the pressure responsive means. It should also be particularly noted that the foregoing advantages are obtained by an extremely simple and compact arrangement in which a minimum number of levers, links and pivotal connections are used to thereby minimize inertia, frictional resistance and the kinetic energy effect of the moving parts.

The simultaneous compression of the bellows 144 and 153 in response to an increase in pressure necessarily displaces some fluid from the chamber 167, but since the bellows 144 and 153 move simultaneously, the actual displacement is a minimum as the compression of bellows 153 tends to maintain the volume of chamber 167 constant. In addition, the aforementioned lever arrangement necessitates only a slight movement of the bellows 144 and 153, approximately 0.09 of an inch, in order to obtain a full stroke of the regulator which also aids in maintaining the actual displacement of fluid at a minimum. Moreover, since the inside diameter of the vessel 175 is six inches, the increase in the height of the hydraulic column produced by a full stroke of the regulator is less than 0.04 inch and the resulting pressure increase, which is comparable to the scale effect of a spring, is less than 0.02 of a pound per square inch.

The effective area of bellows 144 which is subjected to the pressure to be regulated is 11.8 square inches and the effective area subjected to the counteracting force is 10.6 square inches. Therefore, if the no load back pressure is 220 pounds per square inch, the actual force which must be counteracted is 220×11.8 or 2596 pounds and the balancing pressure required equals 2596 divided by 10.6 or 245 pounds per square inch. 2.04 inches of mercury produces a pressure of one pound per square inch which necessitates, neglecting friction and the spring effect of bellows 144 and 153, the use of a hydraulic column of mercury 42 feet in height in order to produce the requisite balancing pressure. The inside diameter of pipe 176 connecting the vessels 174 and 175 is one-fourth of an inch and its cross sectional area is approximately 0.047 square inch. Consequently, the mass of mercury necessary to produce the requisite pressure is approximately 11.6 pounds and, if for purposes of illustration, it is assumed that the water pipes 169 and 178, which are one-half inch inside diameter, are twice the length of the mercury column, pipe 176, (the length employed in actual practice is usually about one-fourth that assumed) it is obvious that the total mass of the fluid moved in response to a full stroke movement of the pressure responsive device is approximately 11.6 pounds plus (2)(4)(11.6) divided by 13.6 which is the approximate weight of the water contained in pipes 169 and 178 since the volume of the water is approximately eight times the volume of the mercury contained in pipe 176 and since the density of mercury is 13.6 times that of water or only 18.4 pounds as compared to 2596 pounds when a weight is directly applied. Thus it is seen that the mass effect of the disclosed arrangement is materially less than that encountered when a weight is directly applied to the pressure responsive device.

The inherent damping effect of a hydraulically balanced system, particularly when modified by the use of a throttling constriction or valve or by a proper selection of the pipe sizes employed to obtain the desired degree of damping, eliminates the use of a dashpot and spring arrangement which is necessary to reduce the chattering effect which is always produced when a weight is employed to create the necessary counteracting force. In this connection, particular attention is directed to the fact that it is essential, in order to obtain satisfactory damping in a regulator system of this type, that the liquid in the system must not act to cause or permit the pressure responsive device to continue to move after reaching a position corresponding to that which it would attain in response to a gradual application of the motivating force.

The use of a smaller weight and a lever arrangement would not only introduce the use of a relatively heavily loaded knife edge which is an undesirable feature but it would also materially increase the kinetic energy imparted to the system since when a weight is directly applied, the kinetic energy imparted is $$\frac{MV^2}{2} \text{ or } \frac{WIVI^2}{2g}$$

whereas when a smaller weight and a lever arrangement is used the kinetic energy imparted, which is $$\frac{WIVI^2R}{2g}$$

is increased due to the fact that $$W2=\frac{WI}{R} \text{ and } V2=RVI$$

Moreover a lever arrangement operable with a mass of approximately fourteen pounds would require a lever of more than one hundred eighty five inches in length, which would render such an arrangement impractical.

The modified form of the regulator illustrated by Fig. 4 in which like numerals are used to designate like parts differs from the form of regulator shown in Figs. 1 and 2 primarily in the construction of the pressure responsive device 38. In the modified arrangement the pressure responsive device 38 comprises a cylindrical casing 217 having at its upper and lower ends outwardly extending annular flanges 218 and 219, respectively, a cover 221 having an annular portion cooperating with the flange 218 to seal the upper end of the cylinder 217 and an annular internally threaded bellows carrier 222 having an annular flange cooperating with the lower flange 219 of the casing 217 to provide a fluid tight joint. The carrier 222 supports an upward extending bellows 223 having a cap member 224. The cap 224 has a depending stepped portion on its under side providing a spring seat 226 and is provided with an axially extending internally threaded recess 227. An annular externally threaded member 228 is threadably engaged with the bellows carrier 222 and has an upward extending reduced portion providing a spring seat 230 in opposed relation to the spring seat 226 formed on the bellows cap 224. A compression spring 231 has its opposite ends engaging the spring seats 226 and 230 to provide a counteracting force for the bellows 223 which may be readily varied by rotating the member 228. An elongated rod 232 extends upward through the member 228 and has its upper end threadably engaged with the bellows cap 224 by means of the internally threaded recess 227 and its lower end pivotally connected with the lever 171 which, in the modified arrangement, is pivotally connected intermediate its ends with a bracket 233 supported on the casing 42. The carrier 222 has a depending arm or bracket 234 which is pivotally connected to the bracket 233 by means of a link 236. The cover 221 also has an upwardly extending arm 237 which is pivotally connected with one end of the lever 20 which, in this arrangement, is also pivotally mounted intermediate its ends on the bracket 21 and it should be particularly noted that the effective length of link 236 is equal to the distance between the end of lever 20 which is pivotally connected to the arm 237 and its point of pivotal connection with the bracket 21 whereby the casing 217 may be moved parallel or in coaxial relation to the bellows 223.

In the modified form of pressure regulator shown in Fig. 4, an increase in the pressure to be regulated produces a downward movement of rod 232 due to the compression of the bellows 223 and, since the lever 171 is pivoted intermediate its ends, the valve member 73 will move in an upward direction which direction is opposite to that produced by a corresponding movement of the bellows 144 in the regulator arrangement shown in Fig. 2. Therefore, in the modified arrangement, the relatively light spring 140 is a tension spring and particular attention is directed to the fact that the stepped portions of the spring retainers 113 and 134 are somewhat longer and externally grooved or threaded to secure the spring 140 thereto. Moreover, since the lever 20 is pivotally connected with the bracket 21 intermediate the points at which it is pivotally connected with the piston 49 and with the regulator casing 217, it should be obvious that movement of the piston 49 will produce a proportional and simultaneous movement of the casing 217 in the opposite direction and that due to the link 236, such movement will be parallel to the movement of the bellows 223, valve member 73 and piston 49. Furthermore, in order to eliminate the scale effect of the spring 231, which produces the counteracting force, it is essential that the distance between the spring seats 226 and 230 be maintained constant so that the relatively light spring 140 constitutes the only biasing means which is effective in determining the scale of the regulator. This result is accomplished by the lever arrangement in which the distance from the end of lever 171 which is pivotally connected with the spring retainer 134 to its point of pivotal connection with the bracket 233 is to the distance from the other end of said lever, which is pivotally connected with the rod 232 to its point of connection with the bracket 233 as the distance from the point at which the piston 49 is connected with the lever 20 to its point of pivotal connection with the bracket 21 is to the distance from the end of said lever which is pivotally connected with the arm 237 to its point of pivotal connection with the bracket 21. Therefore, it should be obvious that a movement of the bellows 223 produces an immediate and like movement of the casing 217 whereby the distance between the spring seats 226 and 230 is maintained substantially constant during operation of the regulator. Except for the differences hereinabove noted, the operation of the regulator shown in Fig. 4 is identical to that of the regulator shown in Fig. 2 and may be substituted therefor in the system illustrated in Fig. 1.

As previously pointed out, there are two possible ways of regulating or operating a superposed turbine in connection with an existing low pressure turbine system and that the mode of regulation or operation is determined by the relative capacities of the superposed turbine and the low pressure system or that portion of the low pressure system which is in actual operation at any particularly time.

The operation of the system illustrated in Fig. 1 when the pressure regulator 14 is rendered inoperative by clamping or locking the operator 40 so that the turbine is regulated solely in response to changes in speed is as follows: If the speed changes due to a change in load, the speed responsive device, assuming the load has increased, moves the rod 29 downward and the remote end of lever 23 and link 22 upward. Since the pressure regulator is inoperative, the lever 18 is fulcrumed intermediate its ends at its point of pivotal connection with the link 19 and upward movement of link 22 and the adjacent end of lever 18 causes a downward movement of the opposite end of lever 18, link 17 and lever 15, the lever 15 moving about its point of pivotal connection with the power piston 8. This movement of the lever 15, lowers the valve 9 admitting fluid under pressure to the under side of piston 8 and places the upper side of said piston in communication with the drain pipe 60. As a result, piston 8, which is pivotally connected with lever 12 intermediate its ends, causes the lever 12 to move in a clockwise direction about its pivot point 13 and open the valve 3 to admit more steam to the turbine. When the load decreases, it should be obvious that the speed responsive device operates the system of levers and the valve 3 in the opposite direction to decrease the steam supplied to the turbine.

However, when the operator 40 of the pressure regulator 14 is unlocked, the speed responsive device is inactive as long as the synchronous speed is maintained constant, and the turbine is normally regulated solely in response to changes in back pressure. Under these conditions, the lever 18 is fulcrumed at its point of connection with the link 22 and, if the back pressure increases, the bellows 144 and 153 in the form of regulator shown in Fig. 2 or the bellows 223 shown in Fig. 4 is slightly compressed and by means of rod 173 or 232 moves the lever 171 to actuate the valve member 73, which moves downward in the arrangement shown in Fig. 2 and upward in the arrangement shown in Fig. 4, and produces a corresponding movement of the piston 49. Movement of the piston 49 in either arrangement moves the end of the lever 20 which is connected with link 19 upward whereby lever 18, which is now fulcrumed at its point of connection with link 22, link 17, lever 15 and valve 9, are raised. This movement of valve 9 admits fluid under pressure to the upper side of the piston 8 and places the under side of piston 8 in communication with the drain pipe 60. As a result, piston 8 moves downward and by means of lever 12 moves the valve 3 toward its closed position to decrease the steam supplied to the turbine. Obviously, if the back pressure decreases, the pressure regulator 14 operates the system of levers and the valve 3 to admit more steam to the turbine. With this arrangement it should be obvious that while the speed responsive device is normally inactive, any material deviation from the normal speed will cause the speed responsive device to adjust the admission valve or valves accordingly. Consequently, the pressure and speed responsive devices are rendered jointly and severally operable to control the flow of the operating fluid through the turbine.

Due to the fluctuating load conditions, it is often necessary to change from speed control to pressure control and vice versa in order to obtain the maximum operating efficiency. To change from pressure control to speed control is a relatively simple matter as all that is necessary is to lock the operator 40 of the pressure regulator 14 against movement by means of the clamping device 98 and adjust the speed responsive device 25 by means of the adjustable fulcrum 24 to maintain the desired load. However, changing from speed control to pressure control is an entirely different matter as it is necessary, in order to avoid a material change in the load carried by the superposed turbine, which might unbalance the entire system, to adjust the position of the valve member 73 with respect to the piston 49 prior to the release of the clamping means 98 so that when the clamping means is released, the piston will not operate to either increase or decrease the load carried by the turbine. The necessity for such an adjustment and the ease with which it can be accomplished with the disclosed invention can be most readily pointed out by means of a practical illustration. Assume the condition of the speed responsive device and the pressure regulator before the change to speed control was such that the superposed turbine was carrying half load, 15,000 kw., and that the normal no load back or exhaust pressure is 220 pounds per square inch and the pressure range of the regulator ten pounds. Then with a load of 15,000 kw., the exhaust pressure would have been 215 pounds per square inch and the regulator would have been in mid position when it was locked by the clamping means 98. Since the change to speed control, the exhaust pressure may have changed to an arbitrary value, say 220 pounds per square inch, and the load may have increased to 30,000 kw. Consequently, the exhaust pressure, which should be 210 pounds per square inch, is 220 pounds per square inch, the valve member 73 is in a position corresponding to a pressure of 220 pounds per square inch and the piston 49 is locked in a position corresponding to an exhaust pressure of 215 pounds per square inch. Therefore, if the clamping means 98 were released under these conditions, the piston 49 would immediately move in a direction to close the steam admission valve 3 which would cause the turbine to immediately drop most of its load and although the action of the speed responsive device would tend to alleviate this condition such operation produces excessive surging which is highly undesirable.

In this connection particular attention is again directed to the fact that the indicator plate 89 on which is pivotally mounted the pointer 91 is carried by and moves with the piston 49 and that the valve member 73 is connected with the pointer 91 by means of the pivotal connection 93 whereby the position of the pointer 91 with respect to the mark 90 on the bracket 89 indicates the relative positions of the valve member 73 and piston 49 and it should be obvious that whenever the pointer 91 is in line with the mark 90 as illustrated in Figs. 1, 2 and 4, the piston 49 and the valve member 73 are in a neutral position; i. e. the ports 67, 69 and 72 in the piston 49 are closed by the valve member 73. Therefore, in order to change over to pressure regulation under the conditions above stated, all that is necessary is to adjust the counteracting force by turning the hand wheel 203 in Fig. 2 or the member 228 in Fig. 4 until the valve member 73 moves the pointer 91 to a position in line with the mark 90 which indicates that the valve member 73 and the piston 49 are in a neutral position. Stated differently, the indicator plate 89 and the pointer 91 constitute a means indicating the nature of the adjustment; i. e. whether the counteracting force should be increased or decreased in order to bring the valve member 73 into a neutral position with respect to the piston 49, and the reestablishment of the neutral position. The clamping means can then be released without in any manner affecting the turbine load and the only further adjustment which is necessary is to restore the pressure regulator and the speed responsive device to conditions corresponding to a load of 15,000 kw., since the piston 49 is in a position corresponding to that load. This further adjustment is readily accomplished by simultaneously moving the hand wheel 34 of the fulcrum 24 in a direction to drop load i. e. the threaded block 30 is lowered and the hand wheel 203 or the member 228 in a direction to reduce the counteracting force. In connection with the foregoing, it should be understood that while hand wheels or the like have been described and illustrated for adjusting the fulcrum 24 and the counteracting force varying means, it is contemplated that such adjustments can be readily made, if desired, by means of motors and gearing which may or may not be remotely and automatically controlled as such variations can be readily effected by any one skilled in the art.

In connection with the foregoing, it should be particularly noted that when the turbine is rendered responsive to variations in back pressure the speed responsive device is always operative to prevent variations in synchronous speed. This results in an inherently stable system which is particularly desirable in connection with the operation of superimposed or top turbines in the manner hereinbefore specified.

It should be understood that it is not desired to limit the invention to the exact construction and mode of operation herein disclosed as numerous variations within the scope of the claims may occur to persons skilled in the art.

It is claimed and desired to secure by Letters Patent:

1. In a regulator combination comprising a control valve, a fluid actuated power operator movable in response to a movement of said control valve to establish a neutral position with respect to the control valve, and a pressure responsive device for actuating the control valve, means for rendering the power operator immovable in response to a movement of said valve, means operative to vary the position of the pressure responsive device, said position varying means being operative when said operator is held immovable to effect an actuation of said control valve from a non-neutral to a neutral position with respect to the power operator, and means actuated by the control valve and the power operator effective to indicate the necessary variation of the position of the pressure responsive device and the reestablishment of the neutral position.

2. In a regulator combination comprising a control valve, a fluid actuated power operator movable in response to a movement of said control valve to establish a neutral position with respect to the control valve, and a pressure responsive device for actuating the control valve in accordance with variations in the pressure to be regulated, means for rendering the power operator immovable in response to a movement of said valve, means operative to vary the position of the pressure device, and said position varying means being operative when said operator is held immovable to effect an actuation of said control valve from a non-neutral to a neutral position with respect to the power operator.

3. In a regulator combination comprising a pressure responsive device and a power operator responsive to and movable an amount proportional to the movement of the pressure responsive device, means for rendering the operator non-responsive to movements of the pressure responsive device, and means indicating the nature of the adjustment necessary to reestablish the relation between the pressure responsive device and the operator which existed at the time the operator was rendered non-responsive and the reestablishment of the said relation.

4. A pressure regulator comprising a casing defining a cylinder and a chamber which is open to the atmosphere and which is in communication with said cylinder through an end wall thereof, a fluid actuated power piston disposed in said cylinder and having a portion extending through said end wall into the adjacent end of said chamber, said piston having an axially extending bore in communication with said chamber and having ports adapted to place said bore in communication with a source of fluid under pressure, in communication with said cylinder on opposite sides of said piston, and in communication with upper and lower drain connections, control means disposed within said bore to control the flow of fluid through said ports and thereby the operation of said piston, said control means having a portion accessible from within the adjacent end of said chamber, a biasing means movable a considerable distance in response to the application of a small force and having one end mounted on an adjustable seat positioned at the other end of said chamber, a flexible means sealing the said adjacent end of said chamber and having oppositely disposed portions with one of said portions operatively connected with the accessible portion of said control means and with the other of said portions operatively associated with the other end of said biasing means, means operable to maintain the accessible portion of said control means in engagement with the said one portion, means mounted on the said other end of said chamber for retarding the rate of movement of said control means and having an operative connection with said flexible means, a pressure responsive device, and means operative to transmit motion from said device to said flexible sealing means and to produce a resulting movement of said control means, said retarding means and said biasing means which is materially greater than the actuating movement of said device.

5. In a regulator combination comprising a device having a member movable in response to variations in a condition to be regulated, a control device actuated by said movable member, and a power operator movable in response to the movement of said control device to establish a non-operating position with respect to said device, means for rendering the power operator immovable in response to a movement of said control device, and means operative to vary the position of said movable member, and said position varying means being operative when said operator is held immovable to effect an actuation of said control device from an operating to a non-operating position with respect to the power operator.

6. In a regulator combination comprising a device having a member movable in response to variations in a condition to be regulated, a power operator movable in response to the movement of said movable member to establish a non-operating position with respect to said member, and regulating mechanism operatively connected with said operator for actuation thereby, means for rendering said operator non-responsive to the movements of said movable member, means for varying the position of said movable member, said position varying means being operative when said operator is non-responsive to effect an actuation of said movable member from an operating to a non-operating position with respect to said operator, and means indicating the nature of the adjustment necessary in order to reestablish a non-operating relation between the movable member and the operator.

7. In a regulator combination comprising a pressure responsive device and a power operator movable in response to the movement of the pressure responsive device, means for rendering the operator non-responsive to movements of the pressure responsive device, and means indicating the nature of the adjustment necessary to reestablish the relation between the pressure responsive device and the operator which existed at the time the operator was rendered non-responsive and the reestablishment of the said relation.

8. In combination with a turbine regulating system including a motive fluid control device, separate regulators each including a movable element adapted to be responsive to a different condition which varies in accordance with changes in turbine load, connections rendering said elements severally responsive to said different conditions, and actuating means interconnecting said elements and said device and rendering the movements of said elements severally effective to actuate said device, means for rendering immovable a portion of said actuating means which is normally responsive to the movement of one of said elements while maintaining said one element responsive to its said varying condition, and means for adjusting the position of said one element, said adjusting means being operative, when said portion of the actuating means is rendered immovable, to move the said one element relative to said portion of the actuating means and to a position such that the said portion of the actuating means can be rendered responsive to the movements of the said one element without simultaneously effecting a movement of the said device.

9. In combination with a turbine regulating system including a motive fluid control device, speed and pressure responsive regulators each including a movable element operatively connected with the turbine, and actuating means interconnecting said elements and said device and rendering the movements of said elements severally effective to actuate said device, means for rendering immovable a portion of the actuating means which is normally responsive to the movements of the pressure regulator element while maintaining said pressure regulator element responsive to variations in pressure, and means for adjusting the position of the pressure regulator element, said adjusting means being operative, when said portion of the actuating means is rendered immovable, to move the pressure regulator element relative to said portion of the actuating means and to a position such that the said portion of the actuating means can be rendered responsive to the movements of the pressure regulator element, without simultaneously effecting a movement of said device.

10. A regulating system for prime movers comprising a movable device adapted to control operation of the prime mover, separate regulators each including an element adapted to be responsive to and movable an amount proportional to the variation in a different condition which varies in accordance with changes in load, actuating means interconnecting said elements and said device and rendering the movement of said elements severally effective to actuate said device, means for rendering immovable a portion of the actuating means which is normally responsive to the movements of one of said elements while maintaining said one element responsive to its said varying condition, and means for adjusting the position of said one element, said adjusting means being operative, when said portion of the actuating means is rendered immovable, to move the said one element relative to said portion of the actuating means and to a position such that the said portion of the actuating means can be rendered responsive to the movements of the said one element without simultaneously effecting a movement of said device.

11. A regulating system for prime movers comprising a movable device adapted to control the operation of the prime mover, separate regulators each including an element adapted to be responsive to and movable an amount proportional to the variation in a different condition which varies in accordance with changes in load, actuating means interconnecting said elements and said device and rendering the movement of said elements severally effective to actuate said device, means for rendering immovable a portion of said actuating means which is normally responsive to the movements of one of said elements while maintaining said one element responsive to its said varying condition, means for adjusting the position of said one element, said adjusting means being operative, when said portion of the actuating means is rendered immovable, to move the said one element relative to said portion of the actuating means and to a position such that the said portion of the actuating means can be rendered responsive to the movements of the said one element without simultaneously effecting a movement of said device, and means indicating the nature and the extent of the adjustment which is necessary in order to effect a movement of the said one element to said position.

12. A regulating system for prime movers comprising a movable device adapted to control the operation of the prime mover, separate regulators each including a movable element adapted to be responsive to a different condition which varies in accordance with changes in load, an operator responsive to a movement of one of said elements, connections rendering movements of said operator and movements of another one of said elements severally effective to actuate said device, means for rendering said one element and said operator relatively movable in non-interacting relation, and means for relatively adjusting said one element and said operator, said adjusting means being operative when said one element and said operator are rendered relatively movable in non-interacting relation, to effect a relative movement of said one element and said operator and thereby a correlation thereof such that said operator can be rendered responsive to the movements of the said one element without simultaneously effecting a movement of said device.

13. A regulating system for prime movers comprising a movable device adapted to control the operation of the prime mover, separate regulators each including a movable element adapted to be responsive to a different condition which varies in accordance with changes in load, an operator responsive to the movement of one of said elements, connections rendering movements of said operator and movements of said another one of said elements severally effective to actuate said device, means for rendering said one element and said operator relatively movable in non-interacting relation, means for relatively adjusting said one element and said operator, said adjusting means being operative, when said one element and said operator are rendered relatively movable in non-interacting relation, to effect a relative movement of said one element and said operator and thereby a correlation thereof such that said operator can be rendered responsive to the movements of the said one element without simultaneously effecting a movement of said device, and means operatively associated with said one element and said operator to indicate the nature and extent of the adjustment which is necessary in order to effect said correlation.

14. A regulating system for prime movers comprising a movable device adapted to control the operation of the prime mover, separate regulators each including a movable element adapted to be responsive to a different condition which varies in accordance with changes in load, and actuating means interconnecting said elements and said device and rendering the movements of said elements severally effective to actuate said device, means for rendering a one of said elements and a portion of said actuating means, which is normally responsive to the movements of said one element, relatively movable in non-interacting relation, and means for relatively adjusting said one element and said portion of the actuating means, said adjusting means being operative, when said one element and said portion of the actuating means are rendered relatively movable in non-interacting relation, to effect a relative movement of said one element and said portion of the actuating means and thereby a correlation thereof such that the said portion of the actuating means can be rendered responsive to the movements of the said one element without simultaneously effecting a movement of said device.

15. A regulating system for prime movers comprising a movable device adapted to control the operation of the prime mover, separate regulators each including a movable element adapted to be responsive to a condition which varies in accordance with changes in load, and actuating means interconnecting said elements and said device and rendering the movements of said elements severally effective to actuate said device, means for rendering a one of said elements and a portion of said actuating means, which is normally responsive to the movements of said one element, relatively movable in non-interacting relation, means for relatively adjusting said element and said portion of the actuating means, said adjusting means being operative, when said one element and said portion of the actuating means are rendered relatively movable in non-interacting relation, to effect a relative movement of said one element and said portion of the actuating means and thereby a correlation thereof such that the said portion of the actuating means can be rendered responsive to the movements of the said one element without simultaneously effecting a movement of said device, and means indicating the nature and the extent of the adjustment which is necessary in order to effect said correlation.

JOHN R. HAGEMANN.